(12) United States Patent
Wagner et al.

(10) Patent No.: US 7,730,510 B1
(45) Date of Patent: Jun. 1, 2010

(54) METHODS AND SYSTEMS FOR CONDITIONALLY MANAGING ENTERTAINMENT SYSTEMS

(75) Inventors: Mark Wagner, Seattle, WA (US); Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 1525 days.

(21) Appl. No.: 10/247,982

(22) Filed: Sep. 19, 2002

(51) Int. Cl.
*G06F 3/00* (2006.01)
*G06F 13/00* (2006.01)
*H04N 5/445* (2006.01)

(52) U.S. Cl. .......................... 725/58; 725/112; 725/133
(58) Field of Classification Search ................... 725/58, 725/112, 133
See application file for complete search history.

(56) References Cited

U.S. PATENT DOCUMENTS

| 7,143,429 | B2* | 11/2006 | Mineyama | 725/58 |
| 7,313,802 | B1* | 12/2007 | Tomsen | 725/23 |
| 2002/0174433 | A1* | 11/2002 | Baumgartner et al. | 725/58 |
| 2005/0028208 | A1* | 2/2005 | Ellis et al. | 725/58 |
| 2005/0273819 | A1* | 12/2005 | Knudson et al. | 725/58 |
| 2006/0253869 | A1* | 11/2006 | Boyer et al. | 725/51 |
| 2008/0163321 | A1* | 7/2008 | Liwerant et al. | 725/112 |
| 2009/0199228 | A1* | 8/2009 | Novak et al. | 725/25 |

* cited by examiner

*Primary Examiner*—Christopher Kelley
*Assistant Examiner*—Charles N Hicks
(74) *Attorney, Agent, or Firm*—Lee & Hayes, PLLC (57) ABSTRACT

Methods and systems for controlling entertainment systems are described. In accordance with one embodiment, one or more conditional directives are developed and injected from externally of an entertainment system into the system. The conditional directives direct the entertainment system to conditionally perform some action that is directed to enhancing the user's experience. Typically, the conditional directives come from an external third party. A conditional directive comprises one or more conditions and one or more actions. The conditions define conditions that are to be met before an action is performed. The actions define actions that are to be performed in the event that one or more associated conditions are met.

56 Claims, 4 Drawing Sheets

METHODS AND SYSTEMS FOR CONDITIONALLY MANAGING ENTERTAINMENT SYSTEMS

TECHNICAL FIELD

This invention relates to entertainment systems and methods for controlling entertainment systems.

BACKGROUND

These days, entertainment systems are becoming increasingly sophisticated. For example, some entertainment systems can utilize sophisticated electronic program guides (or "EPGs") that permit user interactivity in a manner that greatly enhances the user's experience. For example, EPGs can permit a user to actually search for programs that are of interest to them, rather than having to wait until the channel of interest carrying the program scrolls by them. Additionally, entertainment systems often include some type of recording medium on which the user can have programs of interest recorded. For example, systems such as personal video recorders (PVRs) and digital video recorders (DVRs) can enable a user to record, to hard disk, different programs that are of interest to them. In some instances, the user need not know the specific channel and time that a particular program is broadcast in order for the system to record the program. That is, EPGs typically include metadata that is associated with the programs that occur in its listing. This metadata can provide the basis by which interesting and thorough searches can be conducted by the system, for the purpose of identifying and recording programs of interest to the user.

Yet, against the backdrop of these fairly sophisticated and, many times automated systems, problems can exist that result in a user experience that is not all that it could be. For example, it is a fairly simple matter to enable a user to schedule and record a series program such as Friends. The user can, for example, enter the title of the program via their system's user interface, and the system can then automatically record the Friends episodes as they are broadcast. There are instances, however, when there might be television programs that are related in some way to programs that are of interest to the user. Yet, their entertainment system's heuristics and searching mechanism may not necessarily pick up the program. For example, assume that a program called "The Making of Friends" is scheduled to air. This program may contain interviews with the various actors in the series, as well as historical information of interest. Yet, the metadata associated with this program might be sufficiently different from the metadata associated with the series Friends such that the entertainment system does not pick it up. Here then is an instance where a program that is likely to be of interest to the user escapes recording.

The above example is a fairly simple and specific example which illustrates a more general common problem associated with current automated entertainment systems. Specifically, by virtue of the fact that entertainment systems are computerized, they typically do not "think" like humans. Thus, decisions that would be very easy for a human to make (e.g. "let's record The Making of Friends because I really like the series Friends") can be very difficult for an automated system to make.

Accordingly, this invention arose out of concerns associated with providing improved entertainment methods and systems.

SUMMARY

Methods and systems for controlling entertainment systems are described. In accordance with one embodiment, one or more conditional directives are developed and injected from externally of an entertainment system into the system. The conditional directives direct the entertainment system to conditionally perform some action that is directed to enhancing the user's experience. Typically, the conditional directives come from an external third party.

A conditional directive comprises one or more conditions and one or more actions. The conditions define conditions that are to be met before an action is performed. The actions are performed in the event that one or more of the conditions are met.

DETAILED DESCRIPTION

Overview

The inventive principles described below can be used in conjunction with any suitable type of entertainment system, such as a home entertainment system. In the discussion that follows, reference will be made to an entertainment system that may be used for displaying and/or recording programs. Within the context of this document, an "entertainment system" can be a display unit, such as a television screen, coupled to a processing device for performing the data processing steps disclosed herein, or can include any number of interconnected consumer electronic devices, one of which having a processing device for performing the data processing steps disclosed herein. Examples of such consumer electronic devices include, without limitation, a video cassette recorder ("VCR"), a personal video recorder (PVR), a digital video recorder (DVR), a video game system, a stereo system, a television or monitor with data processing capabilities, a cable television box, a digital satellite system receiver ("DSS"), a digital video broadcasting system ("DVB"), a digital versatile disc system ("DVD"), a set-top box that serves as an Internet terminal, and any other device capable of processing data as described herein. Furthermore, the term "entertainment system" is to be understood as a term that broadly describes a television-viewing environment, whether it is located in a viewer's home, at a place of business, in the public, or at any other location.

In one exemplary implementation context, the various embodiments can be implemented in a system that uses a conventional television screen or other display unit to display information and can include, as an example, an UltimateTV® set-top box or a similar Internet terminal that has been adapted to perform the operations that include composing, sending and receiving email, browsing the World Wide Web ("Web"), accessing other segments of the Internet, and otherwise displaying information. An Internet terminal typically uses standard telephone lines, Integrated Services Digital Network (ISDN) lines, cable lines associated with cable television service, or the like to connect to the Internet or other wide area networks.

Figure 3:
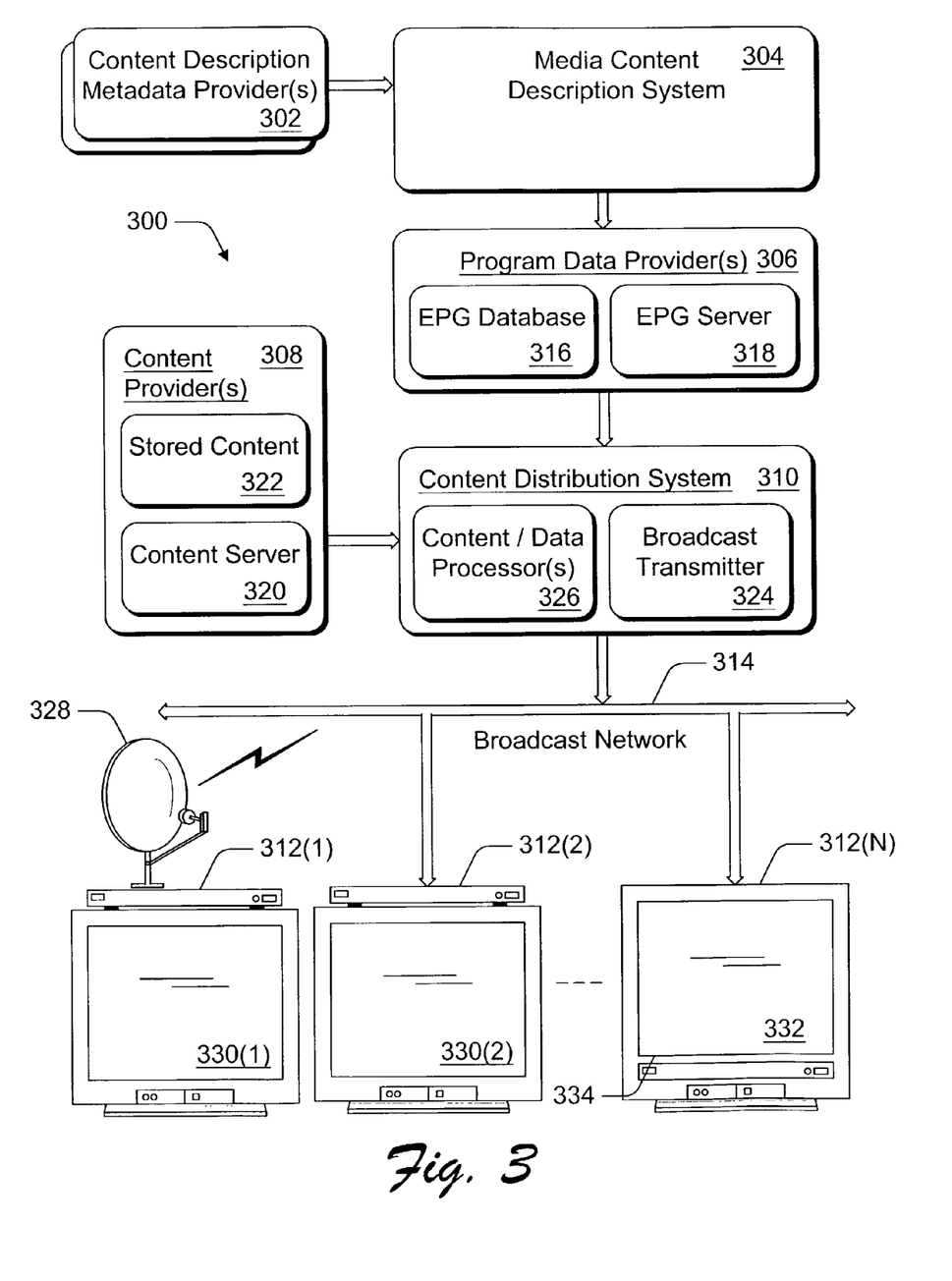
FIG. 3 is a block diagram of an exemplary environment in which one or more of the inventive embodiments can be implemented.
Figure 4:
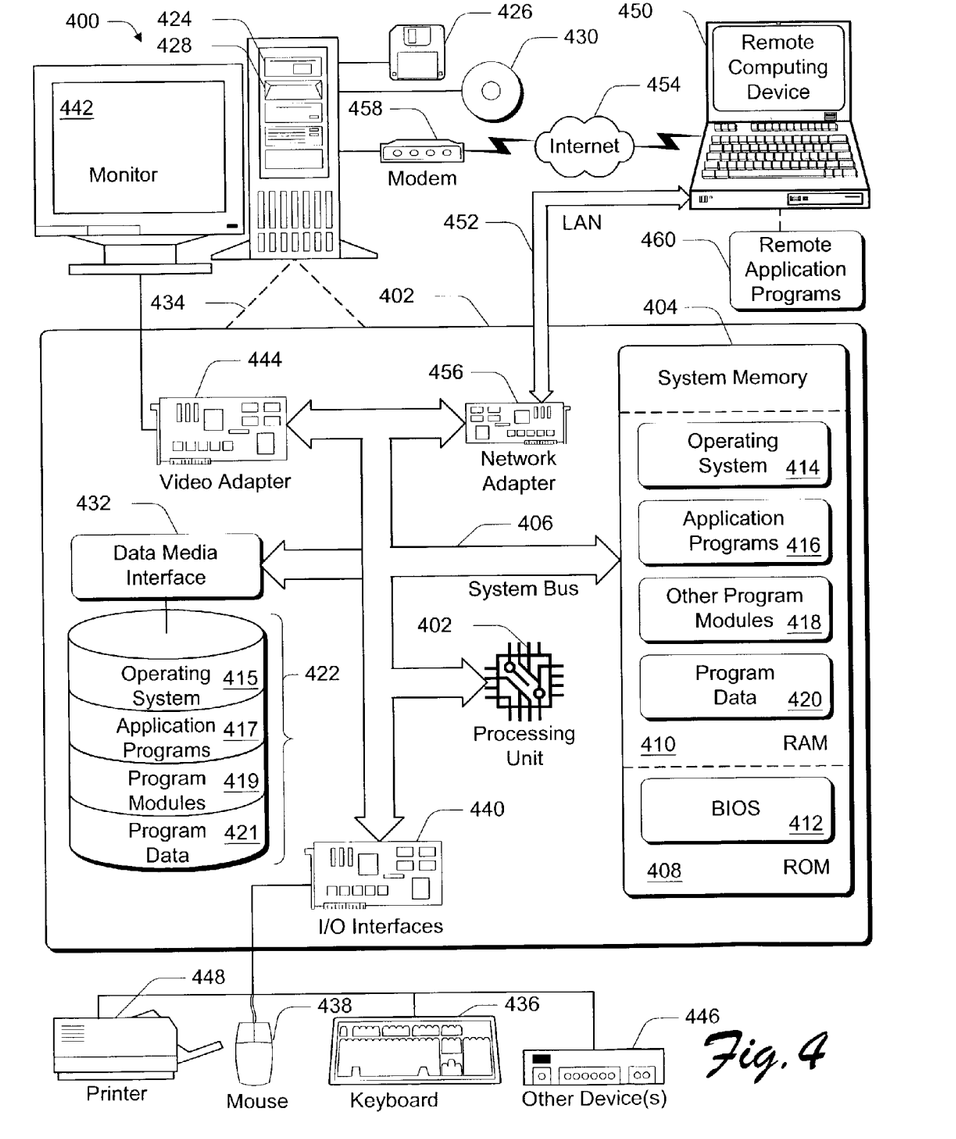
FIG. 4 is a block diagram of an exemplary computer or client device that can be used to implement one or more embodiments.

At the end of this document, FIGS. 3 and 4 illustrate but one exemplary system to provide the reader with an understanding and appreciation of one system that is capable of implementing the embodiments described herein. It is to be appreciated and understood that the description of this exemplary system is not intended to limit application of the claimed subject matter.

Injecting Conditional Directives

In accordance with the embodiments described herein, one or more conditional directives are injected (e.g. via electronic transmission) from externally of an entertainment system into the system. The conditional directives comprise software code that directs the entertainment system to conditionally perform some action that is directed to enhancing the user's experience. Such directives can be injected from one or more directive providers and via any suitable medium that is typically used to provide data to entertainment systems, e.g. via satellite communication, digital/analog cable, network or Internet connection, in-band television broadcast and the like. The directives can be trickle streamed and/or received on a continual or periodic (e.g. nightly) basis.

A conditional directive comprises one or more conditions and one or more actions. The conditions define conditions that are to be met before an action is performed. The actions are performed in the event that one or more of the conditions are met.

In the illustrated and described embodiments, conditional directives can be primarily developed, at least in part, by humans, although an automated implementation is certainly possible. Here, the conditional directives can be directed to events, situations, and occasions that are, in some way, special. That is, there are instances when, due to the automated nature of many entertainment systems, actions that would likely enhance a user's experience may not be performed. The embodiments described below are directed to addressing these instances, among others, and presenting solutions that are more likely to enhance the user's experience. Such will become more apparent as the description below is read.

Figure 1:
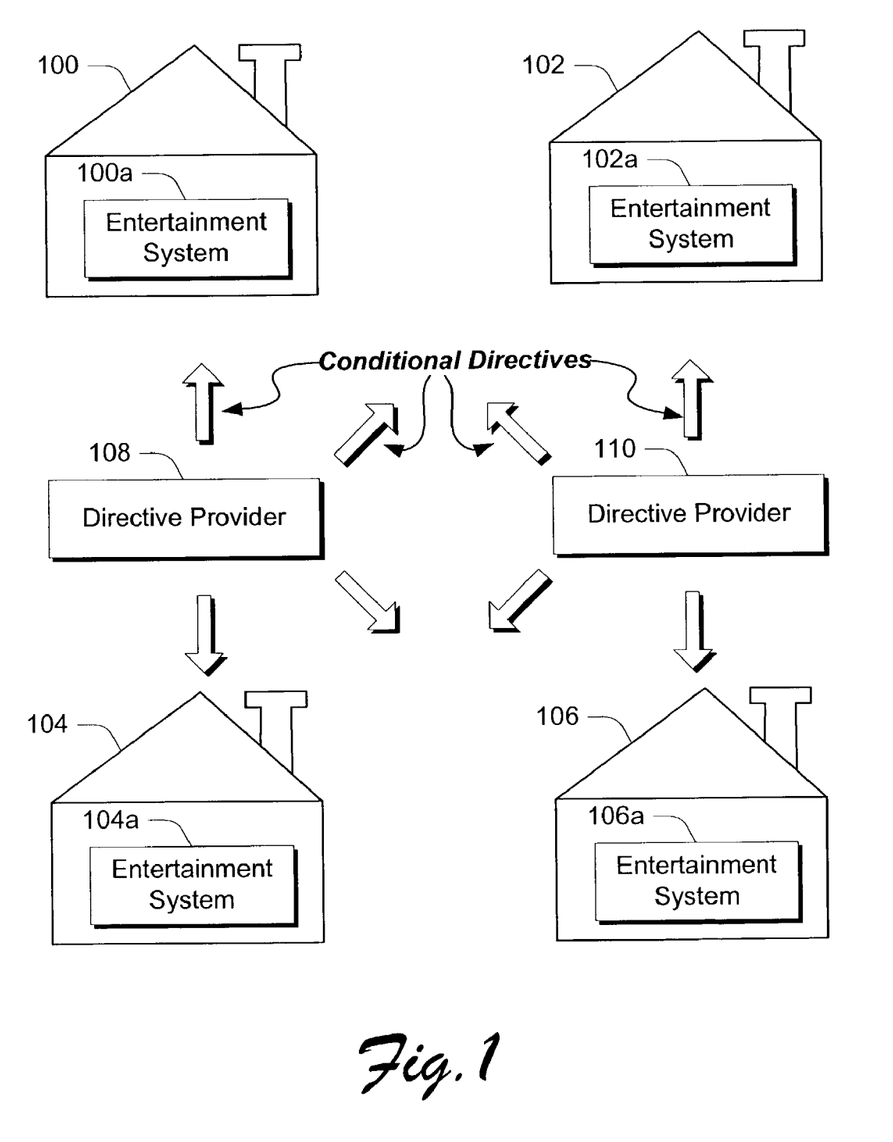
FIG. 1 is a high level block diagram of a system in which various inventive embodiments can be employed.

Preliminarily, however, consider FIG. 1 which is a high level view of a system in which the inventive embodiments can be employed. Here, a number of different users 100-106 each have entertainment systems 100a-106a respectively. One or more directive providers 108, 110 broadcast or otherwise send conditional directives to the users. Each user's entertainment system receives the conditional directives and then, depending on the nature of the directive and, perhaps, whether or not the user has subscribed to a third party directive service, processes the conditional directive.

When a conditional directive is processed, if its condition or conditions are evaluated as being met, then the entertainment system can perform the action or actions that are associated with the condition(s).

Specific Examples of Conditional Directives

As noted above, the conditions and actions of a conditional directive can be drawn along any suitable type of condition(s) and action(s) that can enhance the user experience in some way. As such, the content of conditional directives is really only limited, in some respects, by the imaginations of those who define them or those who design systems that provide conditional directives. In the discussion that follows, specific examples of conditional directives are provided. These examples are not intended to limit, in any way, the claimed subject matter. Rather, these examples are provided so that, among other things, the reader can appreciate some of the contexts in which conditional directives can be used.

Exemplary Conditions of a Conditional Directive

Conditional directives can include one or more conditions, examples of which include conditions that are based upon upcoming events, upcoming one-time events, scheduled series events, a list of auto-records, particular settings of an event, disk utilization, and conflicts, channel lineup/subscription package, to name just a few. Individual examples of some conditions that are drawn along some of the lines mentioned above are explored in more detail below.

With respect to conditions that are based on one-time record events, consider the following. Assume that a user sets up their entertainment system to record the Friends episode that is to be broadcast on the following Thursday. In this example, assume that the user has not set up a series record event on the Friends series that records each week's broadcast. Assume also that the episode that is to be recorded is actually a special two-part episode, the first part of which is to be broadcast on the following Thursday, the second part of which is to be broadcast on the Thursday thereafter. In this case, one of the directive providers can formulate and send the following conditional directive:

If the entertainment system is set to record the upcoming Friends episode, then set the entertainment system to record the Friends episode on the Thursday thereafter.

In this case, when a user's entertainment system receives the conditional directive, it first can ascertain whether the user's system is set to record the upcoming Friends episode. If it is not, then the action of the directive is not executed. If, on the other hand, the user's system is set to record the upcoming Friends episode, then the action (i.e. "set the entertainment system to record the Friends episode on the Thursday thereafter") is performed.

Here then, a conditional directive has been sent from externally of the user's entertainment system and has caused the entertainment system to behave in a manner that is directed to enhancing the user's experience. Specifically, if the user set the entertainment system to record the first of a two-part broadcast but, for some reason, forgot to set the system to record the second part, or simply did not know that there was a second part, the system has, through its execution of the conditional directive, attempted to ensure that the user sees those programs that are likely to be of interest to them. This constitutes but one example of how a conditional directive can be based on an upcoming event. Conditional directives can be based on upcoming events in other ways which are within the spirit and scope of the claimed subject matter.

With respect to conditions that are based on scheduled series events, consider the following. Suppose that a user has set up a series record event to record Monday Night Football every Monday night. Assume that immediately following the game, some other channel, perhaps EPSN, always carries a post game press conference with commentary and player interviews. In this case, one of the directive providers can formulate and send the following conditional directive:

If the entertainment system is set to record Monday Night Football, then record the post game press conference on ESPN.

Here, the conditional directive can cause the entertainment system to behave in a manner that is directed to enhancing the user's experience. Specifically, if the user sets the entertainment system to record Monday Night Football, the system has, through its execution of the conditional directive, attempted to ensure that the user sees those programs that are likely to be of interest to them by recording the post game press conference. This constitutes but one example of how a conditional directive can be based on a scheduled series event. Conditional directives can be based on scheduled series events in other ways which are within the spirit and scope of the claimed subject matter.

With respect to conditions that are based on a list of auto-records, consider the following. An auto-record is a mechanism that a user can use to ensure that the system automatically records events that are of interest to the user. An auto-record can be considered as a recording event that uses criteria defined by the user to search for and match similar criteria in EPG data that is received. For example, assume that a user has set up an auto-record event to record all of the figure skating broadcasts during the Olympics. Often times with events such as the Olympics, the actual broadcast times of the events may not be widely known or made available long in advance of the actual broadcast. Here, however, when a directive provider learns of the times that the skating is going to be broadcast, it can send down a conditional directive that includes the additional times during which skating is to be broadcast. In this case, a directive provider can formulate and send the following directive:

If the entertainment system has an auto-record set for Olympic skating, then on Feb. 8, 2008, record on channel 8 during the following time periods 0800-0845, 1100-1130, and 1530-1645.

Here, the conditional directive can cause the entertainment system to behave in a manner that is directed to enhancing the user's experience. Specifically, if the user sets the entertainment system to record Olympic skating, the system has, through its execution of the conditional directive, attempted to ensure that the user sees those broadcasts that are likely to be of interest to them by recording the skating during the recently-released broadcast times. In this specific situation, the conditional directives can be used to more precisely refine the auto-record functionality by, in a sense, fine tuning it to account for variations, changes, and/or other uncertainties associated with broadcast times. This constitutes but one example of how a conditional directive can be based on a list of auto-records. Conditional directives can be based on auto-records in other ways which are within the spirit and scope of the claimed subject matter.

With respect to conditions that are based on particular settings of an event, consider the following. The particular settings of an event can really include many different settings and types of settings. For example, a user may set up a record event on a program that runs over its allotted time as represented in the EPG. In this case, the particular setting of the event would be that of an "extended time" event. Consider the case where a user sets up a record event on a football game and the game runs over the time listed in the EPG. Here, if a directive provider learns from some source that the program is going to run over, it can formulate a conditional directive that is directed to extending the recording time of the scheduled program. In this case, the conditional directive that is sent to the entertainment systems can look like the following:

If the entertainment system has set up a record event for Monday Night Football, then extend the recording time so that it is 45 minutes longer than the event time in the EPG.

As another example of conditional directives that are based on particular settings of an event, consider the following. In many entertainment systems, users can specify the number of program instances of a particular program they wish to record. For example, a user can set up a series record event on a program and can specify that they only wish for the last three episodes of the program to be recorded. Thus, once the system has recorded three programs of the series, when the next program is broadcast, it can typically delete the earliest program recording. Alternately, when some systems reach the user-specified number of recordings, the system simply stops recording future episodes. This is one way that the system can allow the user to manage their disk space. Now assume that the user sets up a series record event for Friends and establishes that only the last three episodes of Friends are to be recorded. Suppose now that the network concludes the season of Friends with a 2-hour special which consists of four 30-minute segments. If a user has set the system to record only the last three episodes of Friends, then the user will now necessarily miss the last all-important Friends episode. In this case, a directive provider can formulate and send the following conditional directive:

If the entertainment system has a series record event set to record Friends, and has restricted the number of recorded segments to 3 or less, then record the upcoming four Friends episodes.

The conditional directive in this case can also change the number of user-defined segments that are to be recorded for any particular program. In this case, however, the conditional directive may define a time limitation for such change. Here, the conditional directive may look like the following:

If the entertainment system has a series record event set for Friends and has restricted the number of recorded segments to 3 or less, then temporarily redefine the restricted number of segments to 4 or less.

As another example in the context of a user-defined restriction on the number of episodes that can be recorded, consider the following. Suppose that a user has restricted the number of episodes that can be recorded for a particular program to 3 or less. Now, suppose that mid-way through one of the episodes, the program is interrupted for some reason such as a breaking news event, and that a complete recording is not made. In this instance, the entertainment system might count the incomplete recording as a single recording for purposes of complying with the user restriction. Assume now that the network decides to rebroadcast the episode the next evening. Here, a directive provider can formulate and send the following conditional directive:

If the entertainment system was to record episode 103 of XYZ program, then record the rebroadcast of episode 103 of XYZ program on Nov. 9, 2002, and delete the previously-recorded recording of episode 103 of XYZ program.

As an example of conditional directives that are based on disk utilization, consider the following in which a conditional directive is defined to have multiple conditions:

If the entertainment system is set to record Monday Night Football and if there is available disk space, then record the post game press conference on ESPN.

Here, the conditional directive has multiple conditions (i.e. is the system set to record an event and is there available disk space?) that must be met in order for the action to be performed. Accordingly, the entertainment system will only record the post game press conference if the system is set to record Monday Night Football and it has presently-available disk space. In this example, the system can evaluate the present availability of disk space when the game ends.

Another embodiment can look not only at the presently-available disk space, but can look at the disk space that is scheduled to be consumed in the near-term future to ascertain whether or not to record a particular program. As an example, consider the following conditional directive:

If the entertainment system is set to record Monday Night Football and available disk space is predicted over the next week, then record the post game press conference on ESPN.

Here, the conditional directive considers not only whether there is presently enough disk space to make the recording, but it also causes the entertainment system to evaluate and predict the available disk space over a defined time period in the future. For example, if the user has events scheduled that will likely fill up the remaining disk space over the next week, then performing the action of the conditional directive might cause one of the programs that the user has indicated they wish to record not to be recorded. In this case, the action of the conditional directive may not be performed out of deference to the user's specified recording events.

In some embodiments, the conditional directive can be crafted in such a way as to take into account priorities that a user may have assigned to certain programs. For example, if a particular program is set by the user to be recorded and carries a relatively high priority, and there is an associated program that would likely carry a high priority as well, the system might record the associated program after considering the available disk space and the priorities of any programs that are already recorded or scheduled to be recorded. As an example, consider the following conditional directive in connection with a priority system ranging from "1" to "5" with "1" being the highest and "5" being the lowest:

If the entertainment system is set to record Monday Night Football and (if there is available disk space over the next week, or there is not available disk space over the next week and any programs that are to be recorded over the next week have a priority lower than Monday Night Football), then record the post game press conference on ESPN.

Here, assume that the user assigns a priority of "1" to Monday Night Football, and that of the programs the user has set to record over the next week, at least one has a priority of "5". Assume also that if all of the recordings, as specified by the user, are to be made, all of the available disk space will be consumed. Here, in view of the above conditional directive, the post game press conference will be recorded and can carry with it a priority that ensures that it will not be deleted to make room for a lower priority program.

Now, consider this situation from the reverse point of view. Specifically, consider that the conditional directive carries with it an action that defines a particular program to be recorded. Assume that this program, however, is associated with a program that the user has defined to have a low priority. Assume also that the user has defined other programs in the future that are to be recorded and that all of the user-defined programs carry priorities that are higher than the program that is the subject of the conditional directive. In this instance, the action of the conditional directive may not be performed because the priorities associated with the programs that the user actually wishes to record are higher than the program that is the subject of the conditional directive.

In these embodiments, the conditional directives are formulated in a manner that takes into account disk utilization. Disk utilization can be considered from the standpoint of not only the currently-available disk space, but disk space that is to be available in the future.

As an example of conditional directives that are based on conflicts, consider the following. Assume that the user has set up a record event to record The Academy Awards and that the program runs over by one-hour. In this instance, a conditional directive can be formulated and sent to automatically extend the recording time allotted to The Academy Awards. Alternately or additionally, the conditional directive can be formulated in such a way that it is sensitive to conflicts that might occur. As an example, consider the following conditional directive:

If the entertainment system is set to record The Academy Awards, then extend the recording time by one hour unless extending a recording would cause a conflict.

Here, the conditional directive is formulated to extend the recording time so that a program that runs over its EPG-indicated broadcast time can be recorded, unless extending the recording time would cause a conflict. Here, a conflict can exist if there is another previously-scheduled recording and no additional tuner to effectuate recording. The concept of priorities can also be utilized in the conflict resolution process. Specifically, if the program whose recording time is to be extended carries with it a higher priority than the conflicting program, then the system can opt to extend the program's recording time. This can be made subject to approval by the user.

Exemplary Actions of a Conditional Directive

Conditional directives can include one or more actions, examples of which include actions that are based upon deleting an event or series, modifying settings of an event, modifying settings of a recording, and deleting a recording, to name just a few.

With respect to actions that are based upon deleting an event or recording, consider the following. Assume that based upon the EPG data, the user sets up their entertainment system to record a particular program. Assume also that the program gets preempted by some other program, but the entertainment system still records during the time period that the program was to be broadcast. Here, the desired program will not be recorded and it is only afterward that anyone would have known that the program was preempted. In this situation, it can be advantageous to send a directive to delete the erroneous recording. The directive provider might then formulate and send a directive such as the following:

If the entertainment system was set to record The Days Of Our Lives on Feb. $7^{th}$, 2002, and the system recorded during this time period, then delete the recorded program.

As an alternative to deleting a particular recording, a directive can be formulated and sent that effectively modifies a setting of a recording. As an example, consider a directive that changes the priority of the recorded program so that in the event disk space is needed, it is one of the first to be deleted. Assume the same facts as above insofar as a desired program has been preempted by another program. Now, consider the following conditional directive:

If the entertainment system was set to record The Days Of Our Lives on Feb. $7^{14}$, 2002, and the system recorded during this time period, assign the recorded program a priority of "5".

Here, the errant recording is not deleted from the entertainment system. Rather, the recording is assigned a priority level that assures that it will be deleted, if necessary, to free up disk space. Thus, the user is still free to view the recording that preempted their program.

Additionally, settings of a particular program can be modified by, for example, extending the time period over which they are to be recorded. An example of this is discussed above in connection with extending the recording time for a program that runs over its EPG-indicated time slot.

Exemplary Method

Figure 2:
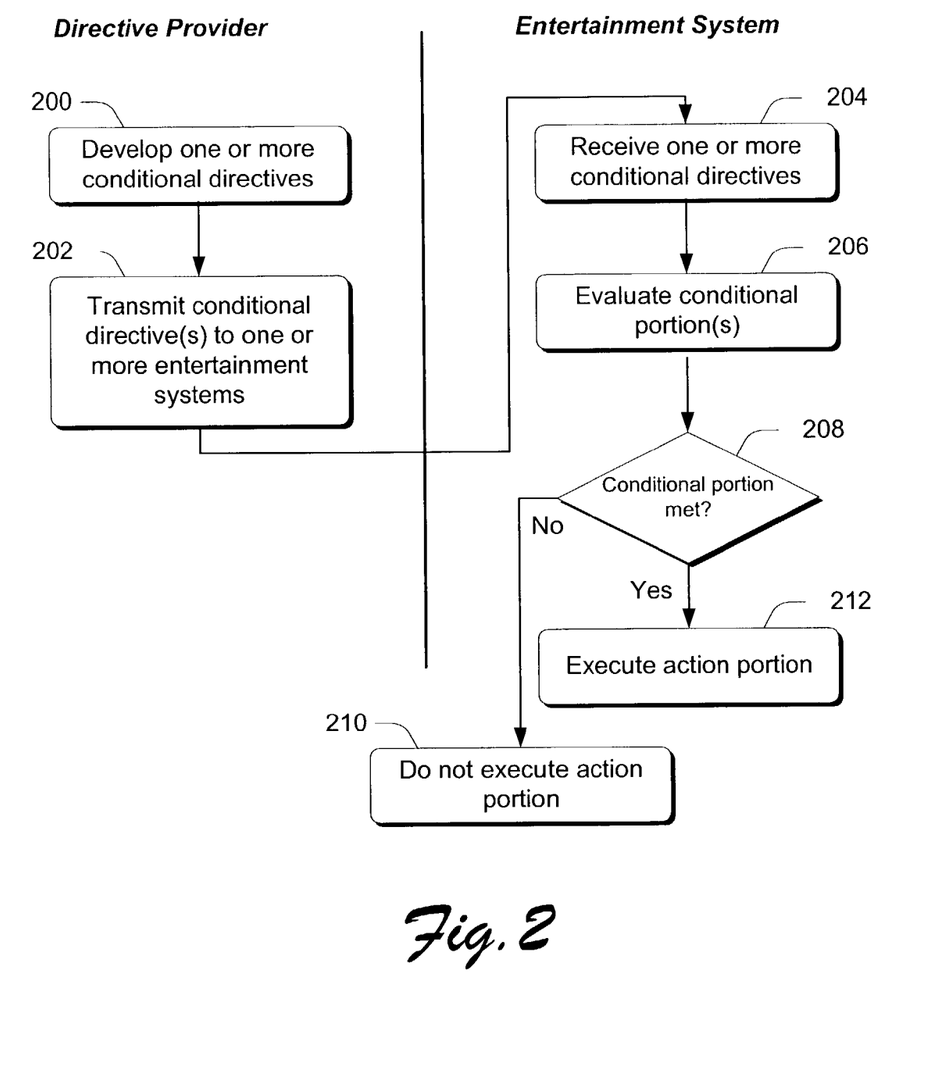
FIG. 2 is a flow diagram that describes steps in a method in accordance with one embodiment.

FIG. 2 is a flow diagram that describes steps in a method in accordance with one embodiment. The method can be implemented in any suitable hardware, software, firmware or combination thereof. In one embodiment, the method can be implemented in connection with a system, such as the systems shown and described in connection with FIGS. 3 and 4. In this example, the flow diagram is divided into two portions—one labeled "Directive Provider" and the other labeled "Entertainment System". The steps that appear underneath the "Directive Provider" portion of the flow diagram are accomplished by a directive provider. A directive provider can be any entities that are capable of formulating and sending out conditional directives. The steps that appear underneath the "Entertainment System" portion of the flow diagram are accomplished in connection with an entertainment system that is utilized by a user.

Step 200 develops one or more conditional directives. Examples of conditional directives are given above. Conditional directives comprise one or more conditions and one or more actions. In some embodiments, development of the conditional directives takes place through the initiatives of human operators. In these instances, information is collected and used to formulate directives that are directed to enhancing the user's experience. For example, a content provider can provide a service by which individuals watch for events that might be the subject of the conditional directive. For example, if a program is pre-empted, various conditional directives can be spawned by the preemption. If a program is extended by the network for some reason, various conditional directives can be created and sent to various entertainment systems so that the systems can react to an otherwise unknown or surprise event or occurrence.

Step 202 transmits the conditional directive(s) to one or more entertainment systems. Transmission can occur via any suitable medium and typically involves some type of electronic transmission from externally of the entertainment system. Examples of transmission media are provided in the sections that follow.

On the entertainment system side, step 204 receives one or more conditional directives. Receipt of the conditional directives typically involves electronically receiving them. Step 206 evaluates the condition(s) of the conditional directive(s). If step 208 determines that a directive's condition(s) is not met, step 210 does not execute the action of the directive. If, on the other hand, step 208 determines that the directive's condition(s) is met, then step 212 executes the action of the directive.

Examples of conditions and actions are given above.

Different System Modes

In accordance with some embodiments, entertainment systems on which the inventive embodiments are to be executed can have different modes of operation which, in turn, provide users with a degree of flexibility in terms of whether they wish to participate in the conditional directive services. For example, in one mode, the user can simply opt to not participate in the service. In this case, the user's entertainment system might receive the conditional directives and simply delete them as received.

In another mode, a user can opt for a user approval mode in which actions of a conditional directive must be approved by the user prior to execution. Here, the system can notify the user, as through a user interface, that it has received one or more conditional directives that would result in execution of an action or actions. If the user gives their approval, then the action can be executed. If, on the other hand, the user does not give their approval, then the action is not performed.

In yet another mode, the entertainment system is configured to automatically process conditional directives and execute any pertinent actions. Here, when the system is set up, the user can select the automatic mode and then essentially forget about it.

Authentication

In some embodiments, a degree of authentication can be provided to ensure that conditional directives are received only from those entities that are supposed to send them. For example, in an open system where the directives are received over the Internet, the sending entity can be authenticated, as through a digital signature and the like, before any of the actions of the directive are performed. In some systems, such as satellite systems, the transport layer is assumed to be more secure such that authentication is not desired or provided.

Exemplary Operating Environment

FIG. 3 illustrates an exemplary environment 300 in which the methods and systems described herein may be implemented. The environment constitutes but one exemplary entertainment system that facilitates distribution of media content, such as programs, and metadata associated with the media content to multiple users. Environment 300 includes one or more content description metadata providers 302, a media content description system 304, one or more program data providers 306, one or more content providers 308, a content distribution system 310, and multiple client devices 312(1), 312(2), . . . , 312(N) coupled to the content distribution system 310 via a broadcast network 314.

Content description metadata provider 302 provides content description metadata associated with media content to media content description system 304. Example content description metadata providers can include, without limitation, movie production companies, movie distribution companies, movie critics, television production companies, program distributors, music production companies, and the like. Essentially, any person, company, system, or entity that is able to generate or supply media content description metadata can be considered a content description metadata provider 302.

Media content description system 304 stores media content description metadata associated with a plurality of metadata categories and stores metadata received from one or more metadata providers 302. In one implementation, the media content description system 304 generates composite metadata based on metadata received from a plurality of metadata providers 302. Media content description system 304 provides the media content description metadata to program data provider 306. Typically, such metadata is associated with many different pieces of media content (e.g., movies or television programs).

Program data provider 306 can include an electronic program guide (EPG) database 316 and an EPG server 318. The EPG database 316 stores electronic files of program data which can be used to generate an electronic program guide (or, "program guide"). The program data stored by the EPG database, also termed "EPG data", can include content description metadata and instance description metadata. For example, the EPG database 316 can store program titles, ratings, characters, descriptions, actor names, station identifiers, channel identifiers, schedule information, and the like.

The EPG server 318 processes the EPG data prior to distribution to generate a published version of the EPG data which contains programming information for all channels for one or more days. The processing may involve any number of techniques to reduce, modify, or enhance the EPG data. Such processes can include selection of content, content compression, format modification, and the like. The EPG server 318 controls distribution of the published version of the EPG data from program data provider 306 to the content distribution system 310 using, for example, a file transfer protocol (FTP) over a TCP/IP network. Any suitable protocols or techniques can be used to distribute the EPG data.

Content provider 308 includes a content server 320 and stored content 322, such as movies, television programs, commercials, music, and similar media content. Content server 320 controls distribution of the stored content 322 from content provider 308 to the content distribution system 310. Additionally, content server 320 controls distribution of live media content (e.g., content that is not previously stored, such as live feeds) and/or media content stored at other locations.

Content distribution system 310 contains a broadcast transmitter 324 and one or more content and program data processors 326. Broadcast transmitter 324 broadcasts signals, such as cable television signals, across broadcast network 314. Broadcast network 314 can include a cable television network, RF, microwave, satellite, and/or data network, such as the Internet, and may also include wired or wireless media using any broadcast format or broadcast protocol. Additionally, broadcast network 314 can be any type of network, using any type of network topology and any network communication protocol, and can be represented or otherwise implemented as a combination of two or more networks.

Content and program data processor 326 processes the media content and EPG data received from content provider 308 and program data provider 306 prior to transmitting the media content and EPG data across broadcast network 314. A particular content processor may encode, or otherwise process, the received content into a format that is understood by the multiple client devices 312(1), 312(2), . . . , 312(N) coupled to broadcast network 314. Although FIG. 3 shows a single program data provider 306, a single content provider 308, and a single content distribution system 310, environment 300 can include any number of program data providers and content providers coupled to any number of content distribution systems.

Content distribution system 310 is representative of a head end service that provides EPG data, as well as media content, to multiple subscribers. Each content distribution system 310 may receive a slightly different version of the EPG data that takes into account different programming preferences and lineups. The EPG server 318 creates different versions of EPG data (e.g., different versions of a program guide) that include those channels of relevance to respective head end services. Content distribution system 310 transmits the EPG data to the multiple client devices 312(1), 312(2), . . . , 312(N). In one implementation, for example, distribution system 310 utilizes a carousel file system to repeatedly broadcast the EPG data over an out-of-band channel to the client devices 312.

Client devices 312 (also referred to as "entertainment systems") can be implemented in multiple ways. For example, client device 312(1) receives broadcast content from a satellite-based transmitter via a satellite dish 328. Client device 312(1) is also referred to as a set-top box or a satellite receiving device. Client device 312(1) is coupled to a television 330(1) for presenting the content received by the client device, such as audio data and video data, as well as a graphical user interface. A particular client device 312 can be coupled to any number of televisions 330 and/or similar devices that can be implemented to display or otherwise render content. Similarly, any number of client devices 312 can be coupled to a television 330.

Directive providers that formulate and send conditional directives also comprise part of system 300. The directive providers can be incorporated into, for example, content distribution system 310 or other similar components, or can comprise standalone components as indicated in FIG. 1. Such might be the case where, for example, a directive provider is a third party service.

Client device 312(2) is also coupled to receive broadcast content from broadcast network 314 and communicate the received content to associated television 330(2). Client device 312(N) is an example of a combination television 332 and integrated set-top box 334. In this example, the various components and functionality of the set-top box are incorporated into the television, rather than using two separate devices. The set-top box incorporated into the television may receive broadcast signals via a satellite dish (similar to satellite dish 328) and/or via broadcast network 314. A personal computer may also be a client device 312 capable of receiving and rendering EPG data and/or media content. In alternate implementations, client devices 312 may receive broadcast signals via the Internet or any other broadcast medium.

Each client 312 runs an electronic program guide (EPG) application that utilizes the EPG data. An EPG application enables a TV viewer to navigate through an onscreen program guide and locate television shows of interest to the viewer. With an EPG application, the TV viewer can look at schedules of current and future programming, set reminders for upcoming programs, and/or enter instructions to record one or more television shows.

The functionality associated with processing conditional directives can reside on the client devices as part of the EPG application, or it can reside in some other application that provides the functionality described in this document.

Exemplary Entertainment System

The various components and functionality described above can be implemented with a number of individual computers that serve as client devices or entertainment systems. FIG. 4 shows components of a typical example of such a computer generally at 400. The components shown in FIG. 4 are only examples, and are not intended to suggest any limitations as to the scope of the claimed subject matter, or the types of clients that can be utilized to implement the inventive embodiments described herein.

Generally, various different general purpose or special purpose computing system configurations can be used. Examples of well known computing systems, environments, and/or configurations that may be suitable for use in implementing the described embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Various functionalities of the different computers can be embodied, in many cases, by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer.

At execution, they are loaded at least partially into the computer's primary electronic memory. The embodiments described herein include these and other various types of computer-readable media when such media contain instructions programs, and/or modules for implementing the steps described above in conjunction with a microprocessor or other data processors. The embodiments also include the computer or client device itself when programmed according to the methods and techniques described above.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 402 (or processor(s)), a system memory 404, and a system bus 406 that couples various system components including the system memory to the processing unit 402. The system bus 406 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400. Communication media typically embodies computer-readable instructions, data structures, program modules or other data in a modulated data signal such as a carrier wave or other transport mechanism and includes any information delivery media. By way of example, and not limitation, communication media includes wired media such as a wired network or direct-wired connection and wireless media such as acoustic, RF, infrared and other wireless media. Combinations of any of the above should also be included within the scope of computer readable media.

The system memory 404 includes computer storage media in the form of volatile and/or nonvolatile memory such as read only memory (ROM) 408 and random access memory (RAM) 410. A basic input/output system 412 (BIOS), containing the basic routines that help to transfer information between elements within computer 400, such as during start-up, is typically stored in ROM 408. RAM 410 typically contains data and/or program modules that are immediately accessible to and/or presently being operated on by processing unit 402. By way of example, and not limitation, FIG. 4 illustrates operating system 414, application programs 416, other program modules 418, and program data 420.

The computer 400 may also include other removable/non-removable, volatile/nonvolatile computer storage media. By way of example only, FIG. 4 illustrates a hard disk drive 422 that reads from or writes to non-removable, nonvolatile magnetic media, a magnetic disk drive 424 that reads from or writes to a removable, nonvolatile magnetic disk 426, and an optical disk drive 428 that reads from or writes to a removable, nonvolatile optical disk 430 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 422 is typically connected to the system bus 406 through a non-removable memory interface such as data media interface 432, and magnetic disk drive 424 and optical disk drive 428 are typically connected to the system bus 406 by a removable memory interface such as interface 434.

The drives and their associated computer storage media discussed above and illustrated in FIG. 4 provide storage of computer-readable instructions, data structures, program modules, and other data for computer 400. In FIG. 4, for example, hard disk drive 422 is illustrated as storing operating system 415, application programs 417, other program modules 419, and program data 421. Note that these components can either be the same as or different from operating system 414, application programs 416, other program modules 418, and program data 420. Operating system 415, application programs 417, other program modules 419, and program data 421 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone, joystick, game pad, satellite dish, scanner, or the like. These and other input devices are often connected to the processing unit 402 through an input/output (I/O) interface 440 that is coupled to the system bus, but may be connected by other interface and bus structures, such as a parallel port, game port, or a universal serial bus (USB). A monitor 442 or other type of display device is also connected to the system bus 406 via an interface, such as a video adapter 444. In addition to the monitor 442, computers may also include other peripheral output devices 446 (e.g., speakers) and one or more printers 448, which may be connected through the I/O interface 440.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 440, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

Conclusion

Conditional directives can provide an effective mechanism for controlling an entertainment system such that the system takes actions that are designed to enhance the user's experience. Some of these actions are directed to recording programs that are likely to be of interest to the user. These actions and their associated conditions can be injected into the entertainment system from outside of the system. One advantage of conditional directives is that the directives can go a long way to bridging the gaps that automated entertainment systems leave due to their automated nature and the heuristics that they typically use to provide services for the user.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for conditionally managing an entertainment system, the method comprising:
    developing—by a directive provider—one or more conditional directives, wherein the directive provider is a third-party service provider that is external of, separate from, but communicatively connected to an entertainment system;
    configuring—by a directive provider—a conditional directive, wherein the conditional directive comprises:
        one or more conditions, wherein a condition defines at least one requisite circumstance for triggering performance of an action, wherein the one or more conditions comprise:
            determining if the entertainment system is set to record an event;
            determining if there is sufficient disk space in the entertainment system to record a television program which would not have been automatically recorded by the entertainment system based on an input received from a user of the entertainment system, wherein determining if there is sufficient disk space to record the event comprises:
                ascertaining current disk space being utilized to record other events; and
                ascertaining current disk space reserved to record other events not yet recorded that will occur in a predetermined time frame; and
            determining a priority associated with the event, wherein the priority associated with the event is assigned by a user of the entertainment system; and
        one or more actions, wherein an action defines operations that are performed when the condition is met, wherein the one or more actions comprise:
            recording the television program which would not have been automatically recorded by the entertainment system if the priority associated with the event is higher than a priority associated with any other event either already recorded in the entertainment center or is scheduled to be recorded in the predetermined time frame;
    electronically transmitting—from the directive provider—the developed conditional directive to the entertainment system.

2. The method of claim 1, wherein the act of developing is performed, at least in part, by a human.

3. The method of claim 1, wherein at least one condition on comprises determining that an upcoming event is scheduled to be recorded.

4. The method of claim 1, wherein at least one condition comprises determining that an upcoming one-time event is scheduled to be recorded.

5. The method of claim 1, wherein at least one condition comprises determining that one or more scheduled series events is scheduled to be recorded.

6. The method of claim 1, wherein at least one condition comprises determining that a list of auto-records exists.

7. The method of claim 1, wherein at least one condition comprises determining that particular settings of an event occur.

8. The method of claim 1, wherein at least one action comprises deleting an event.

9. The method of claim 1, wherein at least one action comprises deleting a series.

10. The method of claim 1, wherein at least one action comprises modifying settings of an event.

11. The method of claim 1, wherein at least one action comprises modifying settings of a series.

12. The method of claim 1, wherein at least one action comprises modifying settings of a recording.

13. One or more computer-readable non-transitory storage media having computer-readable instructions thereon which, when executed by one or more processors, cause the one or more processors to perform a method for conditionally managing an entertainment system, the method comprising:
    developing—by a directive provider—one or more conditional directives, wherein the directive provider is a third-party service provider that is external of, separate from, but communicatively connected to an entertainment system;
    configuring—by a directive provider—a conditional directive, wherein the conditional directive comprises:
        one or more conditions, wherein a condition defines at least one requisite circumstance for triggering performance of an action, wherein the one or more conditions comprise:
            determining if the entertainment system is set to record an event:
            determining if there is sufficient disk space in the entertainment system to record a television program which would not have been automatically recorded by the entertainment system based on an input received from a user of the entertainment system, wherein determining if there is sufficient disk space to record the event comprises:
                ascertaining current disk space being utilized to record other events; and
                ascertaining current disk space reserved to record other events not yet recorded that will occur in a predetermined time frame; and
            determining a priority associated with the event, wherein the priority associated with the event is assigned by a user of the entertainment system; and one or more actions, wherein an action defines operations that are performed when the condition is met, wherein the one or more actions comprise:
  recording the television program which would not have been automatically recorded by the entertainment system if the priority associated with the event is higher than a priority associated with any other event either already recorded in the entertainment center or is scheduled to be recorded in the predetermined time frame;
  electronically transmitting—from the directive provider—the developed conditional directive to the entertainment system.

14. The computer-readable media of claim 13, wherein at least one condition comprises determining that an upcoming event is scheduled to be recorded.

15. The computer-readable media of claim 13, wherein at least one condition comprises determining that an upcoming one-time event is scheduled to be recorded.

16. The computer-readable media of claim 13, wherein at least one condition comprises determining that one or more scheduled series events is scheduled to be recorded.

17. The computer-readable media of claim 13, wherein at least one condition comprises determining that a list of auto-records exists.

18. The computer-readable media of claim 13, wherein at least one condition comprises determining that particular settings of an event occurring.

19. The computer-readable media of claim 13, wherein at least one action comprises deleting an event or series.

20. The computer-readable media of claim 13, wherein at least one action comprises modifying settings of an event.

21. The computer-readable media of claim 13, wherein at least one action comprises modifying settings of a recording.

22. A computerized system embodying the computer-readable media of claim 13.

23. A method for conditionally managing an entertainment system, the method comprising:
  developing, at least in part through the initiative of a human operator, multiple conditional directives, wherein:
    individual conditional directives being configured to direct the entertainment system to conditionally perform at least one user-experience enhancement action directed at enhancing an experience of a user of the entertainment system where the user-experience enhancement action will not be automatically performed by the entertainment system due to an automated nature of the entertainment system unless the individual conditional directive is transmitted to the entertainment system from the directive provider,
    the individual directives comprising one or more conditions and one or more actions,
    individual conditions defining requisite circumstances for triggering performance of an associated individual particular action, wherein the conditions are based on: presently-available disk space associated with the entertainment system to which the directives are being transmitted and disk space predicted to be available in the future,
    individual actions defining operations that are to be performed in an event that one or more associated particular conditions are met; and
  electronically transmitting—from the directive provider—the one or more developed conditional directives to the entertainment system.

24. The method of claim 23, wherein at least one condition can be based on an upcoming event.

25. The method of claim 23, wherein at least one condition can be based on an upcoming one-time event.

26. The method of claim 23, wherein at least one condition can be based on one or more scheduled series events.

27. The method of claim 23, wherein at least one condition can be based on a list of auto-records.

28. The method of claim 23, wherein at least one condition can be based on particular settings of an event.

29. The method of claim 23, wherein at least one condition can be based on conflicts.

30. The method of claim 23, wherein at least some conditions are based on one or more of the following: an upcoming event, an upcoming one-time event, one or more scheduled series events, a list of auto-records, particular settings of an event, and conflicts.

31. The method of claim 23, wherein at least one action can be based on deleting an event or series.

32. The method of claim 23, wherein at least one action can be based on modifying settings of an event.

33. The method of claim 23, wherein at least one action can be based on modifying settings of a recording.

34. The method of claim 23, wherein:
  at least some conditions are based on one or more of the following: an upcoming event, an upcoming one-time event, one or more scheduled series events, a list of auto-records, particular settings of an event, and conflicts; and
  the actions are based on one or more of the following: deleting an event or series, modifying settings of an event, and modifying settings of a recording.

35. A method for conditionally managing an entertainment system, the method comprising:
  electronically receiving one or more conditional directives from a third party service provider that is external of, separate from, but communicatively connected to an entertainment system;
  authenticating the one or more conditional directives;
  configuring individual conditional directives to direct the entertainment system to conditionally perform at least one user-experience enhancement action directed at enhancing an experience of a user of the entertainment system where the user-experience enhancement action will not be automatically performed by the entertainment system due to an automated nature of the entertainment system unless an individual conditional directive is transmitted to the entertainment system from the directive provider, wherein:
    individual conditions define requisite circumstances for triggering performance of an associated individual particular action, wherein the conditions are based on:
    presently-available disk space associated with the entertainment system to which the directives are being transmitted; and
    disk space predicted to be available in the future;
  evaluating one or more conditions of the conditional directives, each individual directive comprising one or more conditions and one or more actions;
  requesting approval to execute the one or more actions from a user;
  executing an action of the one or more conditional directives that is associated with one or more met conditions, responsive to the one or more conditions of the conditional directives.

36. The method of claim 35, wherein at least one condition can be based on an upcoming event.

37. The method of claim 35, wherein at least one condition can be based on an upcoming one-time event.

38. The method of claim 35, wherein at least one condition can be based on one or more scheduled series events.

39. The method of claim 35, wherein at least one condition can be based on a list of auto-records.

40. The method of claim 35, wherein at least one condition can be based on particular settings of an event.

41. The method of claim 35, wherein at least one condition can be based on disk utilization.

42. The method of claim 35, wherein at least one condition can be based on conflicts.

43. The method of claim 42, wherein the conflicts-based condition takes into account priorities associated with individual programs.

44. The method of claim 35, wherein the conditions are based on one or more of the following: an upcoming event, an upcoming one-time event, one or more scheduled series events, a list of auto-records, particular settings of an event, disk utilization, and conflicts.

45. The method of claim 35, wherein at least one action can be based on deleting an event or series.

46. The method of claim 35, wherein at least one action can be based on modifying settings of an event.

47. The method of claim 35, wherein at least one action can be based on modifying settings of a recording.

48. The method of claim 35, wherein:
the conditions are based on one or more of the following: an upcoming event, an upcoming one-time event, one or more scheduled series events, a list of auto-records, particular settings of an event, disk utilization, and conflicts; and
the actions are based on one or more of the following: deleting an event or series, modifying settings of an event, and modifying settings of a recording.

49. An entertainment system comprising:
one or more processors;
one or more computer-readable media; and
computer-readable instructions on the computer-readable media which, when executed by the one or more processors, cause the one or more processors to perform a method for conditionally managing an entertainment system, the method comprising:
developing—by a directive provider—one or more conditional directives, wherein the directive provider is a third-party service provider that is external of, separate from, but communicatively connected to an entertainment system;
configuring—by a directive provider—a conditional directive wherein the conditional directive, comprises:
one or more conditions, wherein a condition defines at least one requisite circumstance for triggering performance of an action, wherein the one or more conditions comprise:
determining if the entertainment system is set to record an event:
determining if there is sufficient disk space in the entertainment system to record a television program which would not have been automatically recorded by the entertainment system based on an input received from a user of the entertainment system, wherein determining if there is sufficient disk space to record the event comprises:
ascertaining current disk space being utilized to record other events; and
ascertaining current disk space reserved to record other events not yet recorded that will occur in a predetermined time frame; and
determining a priority associated with the event, wherein the priority associated with the event is assigned by a user of the entertainment system; and
one or more actions, wherein an action defines operations that are performed when the condition is met, wherein the one or more actions comprise:
recording the television program which would not have been automatically recorded by the entertainment system if the priority associated with the event is higher than a priority associated with any other event either already recorded in the entertainment center or is scheduled to be recorded in the predetermined time frame;
electronically transmitting—from the directive provider—the developed conditional directive to the entertainment system;
evaluating one or more conditions of the conditional directives; and
responding to a condition being met, executing an action of the conditional directive that is associated with the condition.

50. The entertainment system of claim 49, wherein at least one condition comprises determining that an upcoming event is to be recorded.

51. The entertainment system of claim 49, wherein at least one condition comprises determining that an upcoming one-time event is to be recorded.

52. The entertainment system of claim 49, wherein at least one condition comprises determining that one or more scheduled series events is to be recorded.

53. The entertainment system of claim 49, wherein at least one condition comprises determining that a list of auto-records existing.

54. The entertainment system of claim 49, wherein at least one action comprises deleting an event or series.

55. The entertainment system of claim 49, wherein at least one action comprises modifying settings of an event.

56. The entertainment system of claim 49, wherein at least one action comprises modifying settings of a recording.

* * * * *

UNITED STATES PATENT AND TRADEMARK OFFICE
CERTIFICATE OF CORRECTION

PATENT NO. : 7,730,510 B1
APPLICATION NO. : 10/247982
DATED : June 1, 2010
INVENTOR(S) : Mark Wagner et al.

Page 1 of 1

It is certified that error appears in the above-identified patent and that said Letters Patent is hereby corrected as shown below:

In column 16, line 10, in Claim 3, after "condition" delete "on".

In column 16, line 52, in Claim 13, delete "event:" and insert -- event; --, therefor.

In column 19, lines 48-49, in Claim 49, after "directive" insert -- , --.

In column 19, line 49, in Claim 49, delete "directive," and insert -- directive --, therefor.

In column 20, line 2, in Claim 49, delete "event:" and insert -- event; --, therefor.

Signed and Sealed this
First Day of February, 2011

David J. Kappos
*Director of the United States Patent and Trademark Office*